Feb. 23, 1932.  R. B. OTWELL  1,846,274
PATTERN PLANTING STRIP AND MULCH
Filed April 24, 1931
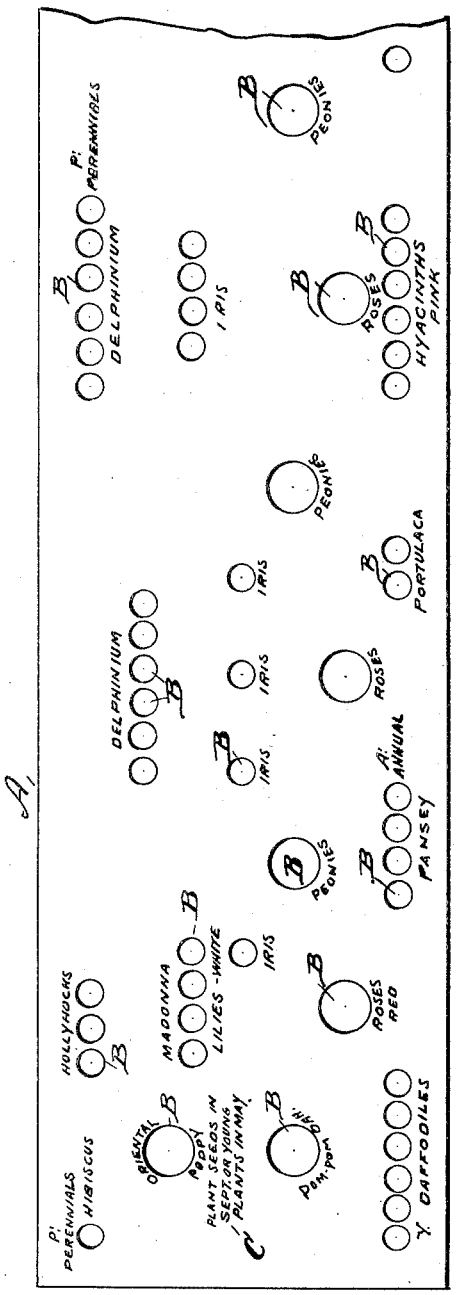
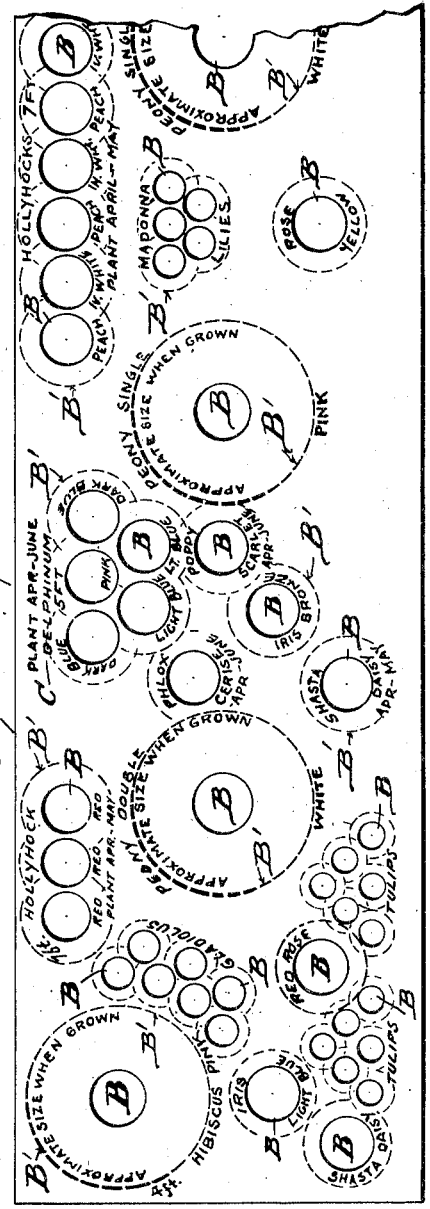
Inventor
Ralph B. Otwell
By S. E. Thomas
Attorney Patented Feb. 23, 1932

1,846,274

UNITED STATES PATENT OFFICE

RALPH B. OTWELL, OF DETROIT, MICHIGAN

PATTERN PLANTING STRIP AND MULCH

Application filed April 24, 1931. Serial No. 532,579.

My invention relates to a method of planting seeds, bulbs or the like embodying the use of a fabric provided with a plurality of openings of suitable size and form, so arranged in relation to each other that when laid upon a suitably prepared seed bed, a planting may be made through the openings therein as indicated on the plan or pattern which will harmonize in size, color and blooming period to produce an artistic, colorful and striking planting effect.

One object of the present invention is to indicate upon a paper strip by printing or other means, adjacent the marginal edge of its respective openings, the names of the shrubs, bulbs or seeds to be planted in the seed bed exposed through the respective openings, and to indicate by symbol or words whether the same are annuals, biennials, perennials or climbers,—also the appropriate time for planting same, the color of the bloom, the approximate size when grown, and other data of interest to the grower.

It is also the purpose of the present invention to group these plants in such relation that they may be complementary in color and size, that is to say the colors of the respective groupings will harmonize with the taller plants or shrubs grouped near one edge for planting adjacent a wall and with those of somewhat lesser height, directly in front of the taller plants, so that upon reaching maturity they may gradually taper downwardly from the taller shrubs or plants toward a group of low-growing border plants, at the outer edge, and thus all may be readily seen and obtain sufficient sunlight for growth.

It is well known that to produce a continuous blooming effect throughout the summer, or a bed which will have a well-rounded top and center, that the bulbs or seeds must be planted progressively at different periods varying from a few days to a week or more, so that the bulbs or seeds first planted may have an earlier start and thereby reach maturity and their blooming period somewhat earlier than those following the first planting.

It is one of the objects of this invention to indicate adjacent the openings by printing or other means such suggestions as may appear desirable regarding the proper culture of the plants that these matters may be given consideration when caring for the plants or seed beds.

This invention has also a dual purpose, for not only is it designed to serve as a pattern for planting shrubs, bulbs or seeds, with definite instructions as to their care, but it also serves as a mulch, covering the seed bed surrounding the planting areas to prevent the evaporation of moisture in the soil that the seeds in the planting areas may be nourished, it being proposed that the mulch should remain on the seed bed during the growing season under normal conditions, it may, however, be removed during a protracted wet season if necessary for the proper development of the plants.

It is well understood by those who have used mulching paper that the soil covered by the paper serves to discourage the growth of weeds,—the moisture however in the soil which might otherwise evaporate is thus conserved and flows to the seeds and bulbs that have been planted in the soil exposed through the openings provided in the mulching paper.

It is also the purpose of this invention to provide the mulching paper with arbitrarily-shaped openings to meet the requirements of those who desire ornamental flowering beds of a geometrical or other form.

It will be obvious that through the use of this invention, beautiful floral effects may be readily visualized by those untrained and inexperienced in such matters due to the grouping of suitable plants which will produce a harmonious and colorful effect, if the directions indicated upon the fabric are properly executed.

It is also my purpose to provide a mulching paper of varying sizes and forms, adapted either for seed beds, a continuous line of planting along fence walls, foundation walls with openings for shrubs,—tall and low growing perennials,—plants living from year to year,—plants living for one to two seasons,—plants resistant to the average seasonal extremes of high and low temperature, also plants that will stand frost and sometimes extremes of heat, the whole being designed to produce a continuous harmonious effect in color, size, and ground line.

It is also the purpose of this invention to provide such data and information adjacent each marginal opening that there may be no room for doubt as to the period in which the respective plantings should be made, the care the plants should receive, the color effect they will produce when in bloom, and the approximate size of the plant upon reaching maturity.

With the foregoing and other objects in view which will appear as the description proceeds, the invention further resides in the combination and arrangement of such details as will be hereinafter described and claimed, it being understood that changes may be made in the precise embodiment of the invention herein disclosed without departing from the spirit of the same.

In the drawings accompanying this specification:

Figure 1 is a diagrammatic plan view indicating a strip of fabric formed with a plurality of openings of suitable form grouped to secure an effective planting of seeds or bulbs sown in the soil exposed through the openings in the fabric, and specific instructions relative to the seeds, bulbs or plants and their care printed adjacent the respective openings.

Figure 2 is a similar diagrammatic view of a strip of mulching paper having a plurality of openings with relatively large dotted areas concentric to the respective openings, to indicate the space covered by the plants when fully grown, and the grouping in relation to other plants adjacent thereto, or other informative data.

Referring now to the letters of reference placed upon the drawings:

A denotes a strip of mulching fabric provided with a plurality of openings B, exposing when laid the previously prepared seed bed, also a plurality of broken lines B¹, denoting the approximate area of the plants when fully grown.

C indicates certain data printed upon or otherwise impressed upon the fabric adjacent the openings,—denoting the character of the plants, bulbs or seeds which are to be planted in the soil through the respective openings, also the time for planting in certain climates, and if progressively planted the time that the respective seeds or bulbs are to be placed in the ground to secure a proper relative growth in reference to each other.

The mulching fabric is preferably of a dark color that it may not be conspicuous and it may be left upon the seed bed during the entire growing season to check the growth of weeds and to conserve the moisture in the soil for the plants.

At the end of the season it may be removed and stored for use in the following year.

Having thus described my invention, what I claim is:

1. A pattern planting strip having a plurality of openings therein suitably grouped and of varying size and form in combination with informative data adjacent the respective openings.

2. A pattern planting strip, comprising a mulching fabric having a plurality of openings therein grouped in a predetermined manner for various sizes of plants and formed in combination with informative data adjacent the respective openings.

In testimony whereof, I sign this specification.

RALPH B. OTWELL.